(12) United States Patent
Surkau

(10) Patent No.: US 7,205,899 B2
(45) Date of Patent: Apr. 17, 2007

(54) FLEXIBLE TRANSPONDER LABEL WHICH IS READABLE ON CONDUCTIVE SURFACES

(75) Inventor: Reinhard Surkau, Fürstenfeldbruck (DE)

(73) Assignee: Schreiner Group GmbH & Co. KG, Oberschleissheim (DE)

( * ) Notice: Subject to any disclaimer, the term of this patent is extended or adjusted under 35 U.S.C. 154(b) by 173 days.

(21) Appl. No.: 10/503,035

(22) PCT Filed: Jan. 11, 2003

(86) PCT No.: PCT/EP03/00205

§ 371 (c)(1),
(2), (4) Date: Nov. 5, 2004

(87) PCT Pub. No.: WO03/067512

PCT Pub. Date: Aug. 14, 2003

(65) Prior Publication Data

US 2005/0083203 A1    Apr. 21, 2005

(30) Foreign Application Priority Data

Feb. 6, 2002    (DE)    ................................ 102 04 884

(51) Int. Cl.
*G08B 13/14*    (2006.01)
(52) U.S. Cl. .............................. 340/572.8; 340/572.5; 340/572.6
(58) Field of Classification Search ............. 340/572.8, 340/572.2, 572.5, 572.6
See application file for complete search history.

(56) References Cited

U.S. PATENT DOCUMENTS

| | | | |
|---|---|---|---|
| 4,774,521 A * | 9/1988 | Okada et al. ............ | 340/572.5 |
| 4,990,891 A | 2/1991 | Reeb | |
| 5,059,950 A | 10/1991 | Perchak | |
| 5,285,191 A * | 2/1994 | Reeb ........................ | 340/572.5 |
| 5,912,622 A | 6/1999 | Endo et al. | |
| 6,371,380 B1 | 4/2002 | Tanimura | |
| 6,894,660 B2 * | 5/2005 | Sanogo .................... | 340/572.2 |
| 7,012,530 B2 * | 3/2006 | Droz ........................ | 340/572.6 |
| 2003/0117336 A1 | 6/2003 | Droz | |

FOREIGN PATENT DOCUMENTS

| | | |
|---|---|---|
| DE | 31 43 208 | 5/1983 |
| DE | 41 29 446 | 3/1992 |
| DE | 38 80 202 | 8/1993 |
| DE | 195 16 448 | 11/1996 |
| DE | 197 33 849 | 6/1998 |
| DE | 298 04 579 | 1/1999 |

(Continued)

*Primary Examiner*—John Tweel, Jr.
(74) *Attorney, Agent, or Firm*—Collard & Roe, P.C.

(57) ABSTRACT

A transponder label includes an antenna coil, a semiconductor chip, and a single layer film, which acts both as a carrier film and as a shield against the induction of counter magnetic fields in the metallic base layer. The semiconductor chip acts both as a capacitor element of the transponder resonant circuit and as a memory component. The film is a flexible matrix including embedded ferrite particles, which give the film soft magnetic characteristics. The permeability value of the film is adapted to its thickness and the material of the base layer, the value being higher for a reduced thickness. The resonant frequency of the transponder resonant circuit formed from the antenna coil and semiconductor chip lies within a narrow target frequency range, once the label has adhered.

11 Claims, 1 Drawing Sheet

FOREIGN PATENT DOCUMENTS

| | | |
|---|---|---|
| DE | 198 48 833 | 9/2000 |
| DE | 200 08 705 | 9/2000 |
| DE | 100 40 439 | 5/2001 |
| EP | 0 295 028 | 12/1988 |
| JP | 2000113142 | 4/2000 |
| WO | WO 0180173 | 10/2001 |

* cited by examiner

FLEXIBLE TRANSPONDER LABEL WHICH IS READABLE ON CONDUCTIVE SURFACES

CROSS REFERENCE TO RELATED APPLICATIONS

Applicants claim priority under 35 U.S.C. §119 of German Application No. 102 04 884.3 filed on Feb. 6, 2002. Applicants also claim priority under 35 U.S.C. §365 of PCT/EP03/00205 filed on Jan. 11, 2003. The international application under PCT article 21(2) was not published in English.

BACKGROUND OF THE INVENTION

1. Field of the Invention

The present invention relates to a transponder label.

2. The Prior Art

Transponder labels, generally also called RFID labels, which have a resonant circuit with a coil element and a condenser element, which can be shifted into resonance in a radio frequency range in order to detect the label, and, likewise also to supply a semiconductor chip mounted on the label with energy, are widely distributed. They are used, among other things, for the protection of goods and in many other applications, above all, in the field of logistics. In addition to the pure detection of the labels or the goods, on which these are mounted, also the job of contact-free data transmission is common, for example, in order to read out a product code or further product specifications stored on a chip mounted on the label. Typically, detection or reading apparatuses used for this purpose operate today with a frequency of 13.56 MHz. Also, the resonance frequency of the transponder resonant circuit of the respectively used FRID labels lies in this range. In addition, also transponder systems with an operating frequency of 100 to 135 kHz are common, but which are characterized by a well defined transmission rate and large manufacturing cost of the corresponding label, because of the commonly used wire coils.

Common transponder labels of the described type cannot be used for identification of metallic objects, since they no longer can be detected or read after mounting on an electrically conductive surface. This is based on the fact that the high frequency magnetic alternating field, which is required for excitation of the transponder resonant circuit and thus, for inductive energy transmission in the transponder label, induces eddy currents in the electrical-conductive surface, which, in turn, produces an oppositely oscillating magnetic field. Near the conducting surface, therefore, an intense weakening of the incidental field takes place.

From DE-A-195 16 448, a flexible plastic film is known, in which ferrite particles are incorporated as magnetically soft material, as well as its use for shielding of an HF coil against metals. Also, already label-type transponder structures with semiconductor chips exist, which have such a ferrite film for shielding metallic against metallic subsurfaces. The ferrite film, on which antenna coils and chips are applied, always has a thickness of at least 1.5 mm, in order to achieve a sufficient shielding against the conductive bedding layer, whereby the possible reading ranges already are greatly reduced with the noted minimal thickness. The film thickness of 1.5 mm, therefore, also is not fallen short of, since instead underlying metallic substrate affects too great of a detuning of the transponder to frequencies that are too high; that is, the resonance frequency of the transponder resonance circuit increases. The energy supply principle and the data interchange principle of the magnetic coupling, however, functions only based on the resonance characteristics of the transponder resonance circuit. If the actual resonance frequency of the transponder resonance circuit lies too far outside of a narrow target frequency range at the operating frequency of the detection or reading apparatus, the currents induced in the transponder resonance circuit are too small to make possible a sufficient transmission range.

From the need for larger minimum film thicknesses with common label-type transponder structures, substantial problems for practical use are provided. In particular, application on highly curved surfaces in a typical labeling manner by means of adhesives is made much more difficult, since the thick film structure produces a relatively high restoring moment upon bending. Generally, a corresponding structural thickness also is undesired, because long-extending projections on the surface of the object to be marked would limit its use or be disadvantageous on aesthetic grounds. An application on common, non-protected transponder labels is largely missing.

SUMMARY OF THE INVENTION

In light of the described problems, the object of the present invention is to produce a transponder label, which is detectable or readable on conductive, for example, metallic surfaces, and which still has sufficient bending flexibility and simplicity in application.

According to one aspect of the present invention, this object is solved by a transponder label for application on an electrically conductive substrate, which has a resonance circuit containing a coil element and a condenser element with a resonance frequency in the radio wave range and a thin, flexible, single- or multi-layer film with a portion of magnetically soft material, preferably ferrite, which affects an increase of the permeability rate of the film. The film extends over at least a majority of the surface of the transponder label taken up by the coil element and is located between the coil element and the substrate upon application of the transponder label. The thickness of the film layers and the rate of permeability of the film relative to one another and on the substrate determined for application are coordinated, such that upon application of the transponder label on the substrate, a sufficient magnetic shielding against the substrate is permitted, that is, a correspondingly reduced field weakening, such that the resonance frequency lies in a predetermined goal frequency range. This goal frequency range represents the most narrow frequency range possible at the operating frequency of the detection or reading apparatus, which should be used for detection of the transponder label or for reading of the data stored on the semiconductor chip mounted thereon.

While with commonly shielded label-type transponder structures, a minimal thickness of the ferrite film of 1.5 mm is required in order to permit detectability or readability, with the transponder label of the present invention, it was surprisingly shown that also thinner films with magnetically soft characteristics can offer a sufficient shielding, when one coordinates the rate of permeability and the thickness of the film or its layers on one another, as well as on the substrate. By using a film with a higher rate of permeability, its thickness in the structure of the transponder label can be reduced substantially, without markedly causing a weakening of the field by eddy currents induced in the conductive substrate. The reduced thickness of the transponder label of the present invention leads to an improved bendability based on reduced resistance moments, so that the transponder label can be attached well also on curved surfaces with a self-adhesive coating, preferably provided on the underside.

Preferably, the flexible film is thinner than 1 mm and has a rate of permeability of at least 10. In a manner not predictable to the practitioner, standard transponder inlays having a permeability rate between 13 and 17 and a film thickness, depending on the material of the conductive substrate, between 0.3 and 0.8 mm are made as particularly advantageous. With the use of 13.56 MHz transponder technology with a permeability rate of the film of approximately 15, good readability and detectability on nickel with a film thickness of 0.3 mm, on steel with a film thickness of 0.7 mm, and on aluminum with a film thickness of 0.8 mm, can be achieved. Essentially thinner film thicknesses with essentially higher permeability rates lead, in contrast, to an over-proportional reduction of transponder sensitivity.

According to an advantageous further embodiment of the present invention, the flexible film has a thin film layer, which is free of the magnetically soft material, whereby this film layer can be arranged on the side facing the coil element or on the side facing away from the coil element. Preferably, the flexible film extends over the entire surface of the transponder label, since this, for one, simplifies the manufacture, and for another, contributes to the robustness of the transponder label. However, for compensation of an undesired large detuning of the resonance frequency of the transponder to lower frequencies, a part of the surface taken up by the coil element is excluded; thus, the film under the coil element has a space or recess.

While for common transponder labels, transponder inlays with the least possible detuning are selected, that is, a least possible deviation of the resonance frequency from the intended operating frequency, for the labels of the present invention, surprisingly, another design is set forth: particularly advantageous with the use of very thin films, the transponder resonance circuit is detuned, such that its resonance frequency before the application on the conductive substrate and in simultaneous absence of the film having the magnetically soft material lies clearly beneath the operating frequency of the reading or detection system to be used, or beneath the predetermined target frequency range. Since the conductive substrate still affects a protection of an increase of the resonance frequency of the transponder resonance circuit of the label, as soon as this is applied, it makes possible the deliberate pre-detuning of the transponder resonance circuit of the described type, provides a particularly narrow target frequency range, and nevertheless maintains the detuning criteria of the present invention. The actual resonance frequency in the operating-ready state, then, lies particularly near to the operating frequency of the detection or reading apparatus, which should be used for detection of the transponder label or likewise, for reading of the data stored on the semiconductor chip mounted thereon. As an advantage, a particularly good utilization of the resonance effect results. A favorable recognition or reading range thus can be achieved with the illustrated features. Selectively, a pre-detuning of the described type relative to the use of a transponder inlay that is not pre-detuned accordingly makes possible a thinner structuring of the film having the magnetically soft material with a somewhat reduced reading range.

According to a further advantageous embodiment, a resonance circuit with an increased resonance performance is used relative to standard transponder inlays. The resonance performance is selected, such that it lies above a fixed value before the application of the transponder label on the conductive surface, which is not exceeded, however, in the operation-ready state on the substrate. The corresponding value preferably lies between 20 and 30 and thereby is to be fixed or estimated in the noted range by means of design samplings.

Particularly advantageous is to provide an upper label, which protects the underlying transponder components, that is, the antenna coil and the provided semiconductor chip, against outer affects, such as moisture, mechanical stresses, or affects caused by an abnormal ambient temperature. Such an upper label preferably can comprise an upper-laminated, printed plastic film. A particularly good protection of the electronic components is provided with a coating of polyurethane casting resin.

As set forth above, it is advantageous to apply an integrated circuit element in the form of a semiconductor chip on the transponder label. The chip then serves for data storage and functions preferably also as a condenser element.

BRIEF DESCRIPTION OF THE DRAWINGS

Next, an embodiment of the present invention will be described in greater detail with reference to FIG. 1, which shows a transponder label as well as a section of the conductive substrate according to the present invention, on which this is applied. The illustration is not to scale and is to be viewed as purely schematic. In particular, the layer thicknesses are shown greatly enlarged.

DETAILED DESCRIPTION OF PREFERRED EMBODIMENTS

Figure 1:
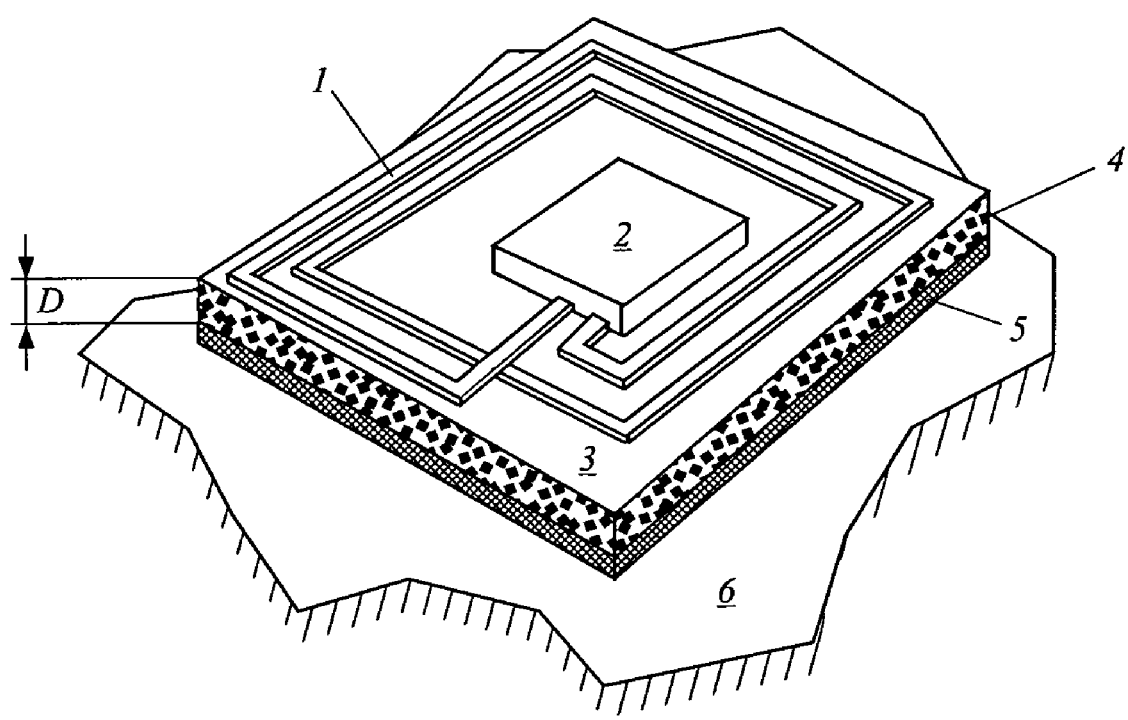

The transponder label shown in FIG. 1 has an antenna coil 1, a semiconductor chip 2, as well as a single-layer film 3 with the thickness D, which serves as a support film, for one, and for another, as a protection against the induction magnetic counter field in the metallic substrate 6, which affects a weakening of the oscillating magnetic field required for the transponder scanning.

The semiconductor chip 2 fulfills the function of a condenser element of the transponder resonance circuit, as well as the function of a storage component, on which specific data of the product are stored, a part of which represents the metallic substrate 6. The specific data, for example, can be a product code, a serial number, or the technical properties characterizing the product.

The film 3 comprises a flexible matrix, for example, silicon rubber, in which ferrite particles 4 are embedded, which bestow soft magnetic qualities on the film 3 and therewith are responsible for its shielding effectiveness. The permeability rate of the film 3 is determined by its thickness D and the material of the substrate 6, whereby it is largely selected with a minimal thickness D. If the substrate 6 comprises aluminum, then with a thickness of D=0.8 mm and the use of a standard transponder inlay, a permeability rate of approximately 15 is particularly suited. By means of the features of the present invention of a deliberately selected transponder pre-detuning to be described next, however, a reduced required film thickness D is realized for the described example.

The transponder assembly of the illustrated label is designed for a reading frequency of 13.56 MHz; this means that the resonance frequency of the transponder resonance circuit comprising the antenna coil 1 and semiconductor chip 2 lies with an adhered label in a narrow target frequency range at this value. In order to maintain these criteria with the reduced thickness of the film 3, the transponder resonance circuit is detuned before the application on the substrate 6 to lower frequencies, such that its resonance frequency lies in absence of the film 3 clearly beneath the reading frequency.

The safe application of the label on the substrate 6 is accomplished by means of an adhesive coating 5, which is covered before the adhesion of the label for this purpose with a peel-off material.

A printed upper label made of plastic is not shown, with which the shown label structure is coated, and which offers a known protection of the semiconductor chip 2 as well as the antenna coil 1 against outer affects of a chemical, mechanical, or thermal nature.

The invention claimed is:

1. Transponder label for application on an electrical conductive substrate, which has the following:
    a resonance circuit having a coil element and a condenser element with a resonance frequency in a radio wave range and
    a flexible film with at least one layer, said film being thinner than 1 mm and having a portion of magnetically soft material which effects an increase of a permeability rate of the film to be equal to or greater than 10,
    wherein the film extends over at least a majority of the surface of the transponder label taken up by the coil element and which is located upon application of the transponder label between the coil element and the substrate,
    wherein the thickness of the film layers and the permeability rate of the film are coordinated to one another and on the substrate determined for application, such that upon application of the transponder label on the substrate, a sufficient magnetic shielding against the substrate is permitted, and the resonance frequency lies in a predetermined target frequency range
    and wherein the resonance circuit has a resonance performance, which lies over a fixed value before the application of the transponder label on the conductive substrate, which, however, is not exceeded in the operation-ready state on the substrate.

2. Transponder label according to claim 1, wherein the permeability rate of the film is between 13 and 17 and the film thickness is between 0.3 and 0.8 mm.

3. Transponder label according to claim 1, wherein the magnetically soft material is ferrite.

4. Transponder label according to claim 1, wherein the transponder label has a self-adhering coating for application onto the substrate.

5. Transponder label according to claim 1, wherein the film has a film layer on a side facing the coil element, which is free from the magnetically soft material.

6. Transponder label according to claim 1, wherein the film has a film layer on a side facing away from the coil element, which is free from the magnetically soft material.

7. Transponder label according to claim 1, wherein the film extends over the entire surface of the transponder label.

8. Transponder label according to claim 1, wherein the resonance frequency of the resonance circuit with the simultaneous absence of the electrically conductive substrate and the film having a portion of magnetically soft material lies beneath the predetermined target frequency range.

9. Transponder label according to claim 1, wherein the fixed value lies between 20 and 30.

10. Transponder label according to claim 1, wherein the transponder label has an integrated circuit element.

11. Transponder label according to claim 10, wherein the integrated circuit element includes a condenser element.

* * * * *